April 22, 1952  C. A. COMSTOCK  2,593,986
COMBINATION GAUGE AND FIXTURE SET
Filed April 29, 1947  3 Sheets-Sheet 1

INVENTOR.
CLARENCE A. COMSTOCK
BY
H. G. Manning
ATTORNEY

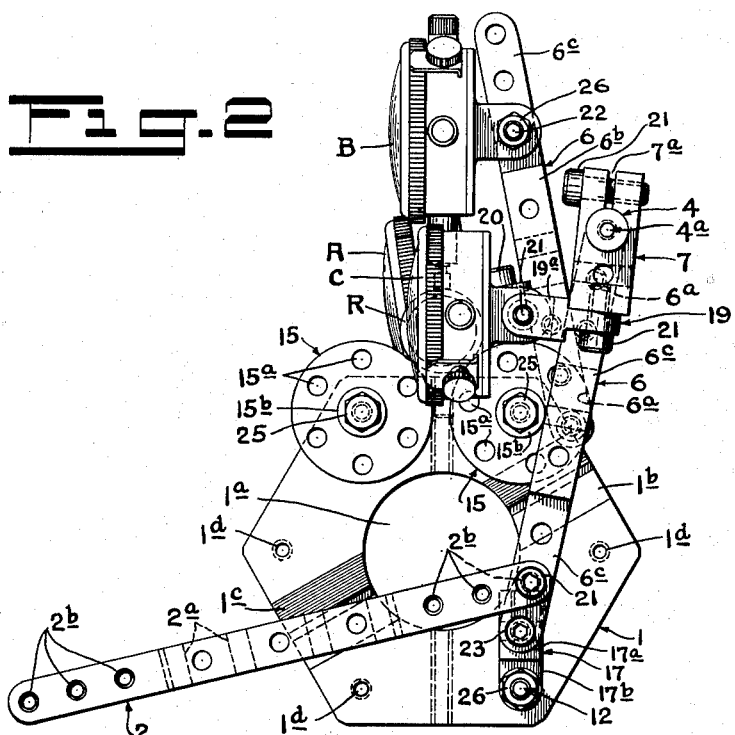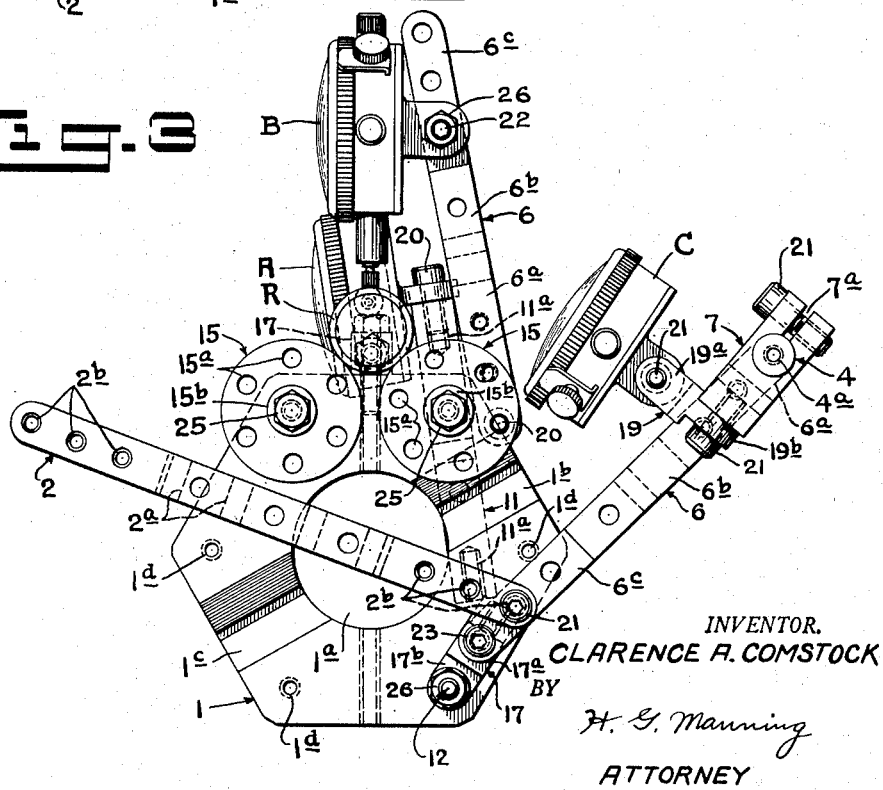

April 22, 1952     C. A. COMSTOCK     2,593,986
COMBINATION GAUGE AND FIXTURE SET
Filed April 29, 1947     3 Sheets-Sheet 3
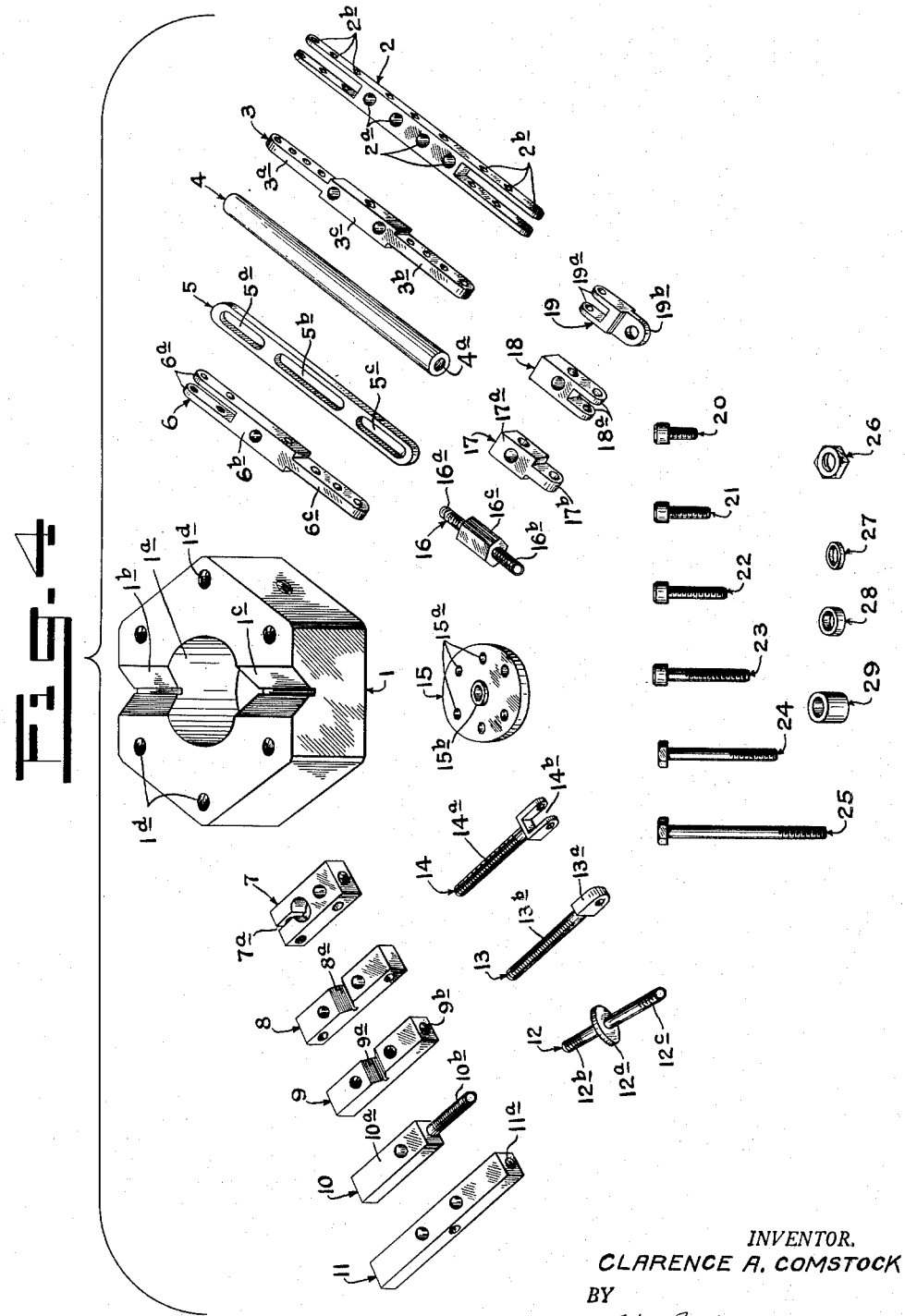
INVENTOR.
CLARENCE A. COMSTOCK
BY
H. G. Manning
ATTORNEY Patented Apr. 22, 1952

2,593,986

UNITED STATES PATENT OFFICE 2,593,986

COMBINATION GAUGE AND FIXTURE SET

Clarence A. Comstock, New Britain, Conn.

Application April 29, 1947, Serial No. 744,711

3 Claims. (Cl. 33—174)

This invention relates to inspection gauges, and more particularly to a universal gauge apparatus consisting of a collection of parts which may be assembled in various ways to produce an indefinite number of different gauges and fixtures which may be used for routine inspection of various parts of manufactured articles.

One object of the present invention is to provide a gauge apparatus of the above nature comprising an assemblage of a base block, a plurality of dial gauges, links, brackets, clamps, bushings, disks, etc., which are adapted, when assembled, in one example, to permit the simultaneous measurement of the length, diameter, and end squareness of a cylindrical roller block.

A further object is to provide an apparatus of the above nature which will be capable of universal use, will be time-and-money-saving, rigid, and simple in construction, inexpensive to manufacture, easy to install and manipulate, compact, ornamental in appearance, and very efficient and durable in use.

With these and other objects in view, there has been illustrated on the accompanying drawing one form in which the invention may conveniently be embodied in practice.

In the drawings,

Fig. 3 is a similar end view of the same, with the length-indicating dial gauge in open position, to permit removal of the roller bearing being measured.

Fig. 4 is a perspective view, in separated relationship of all of the parts of the set from which the gauge may be assembled.

Fig. 5 is a partial rear view of the set showing the connection of the end-squareness gauge to the said block.

Figures 1, 2:
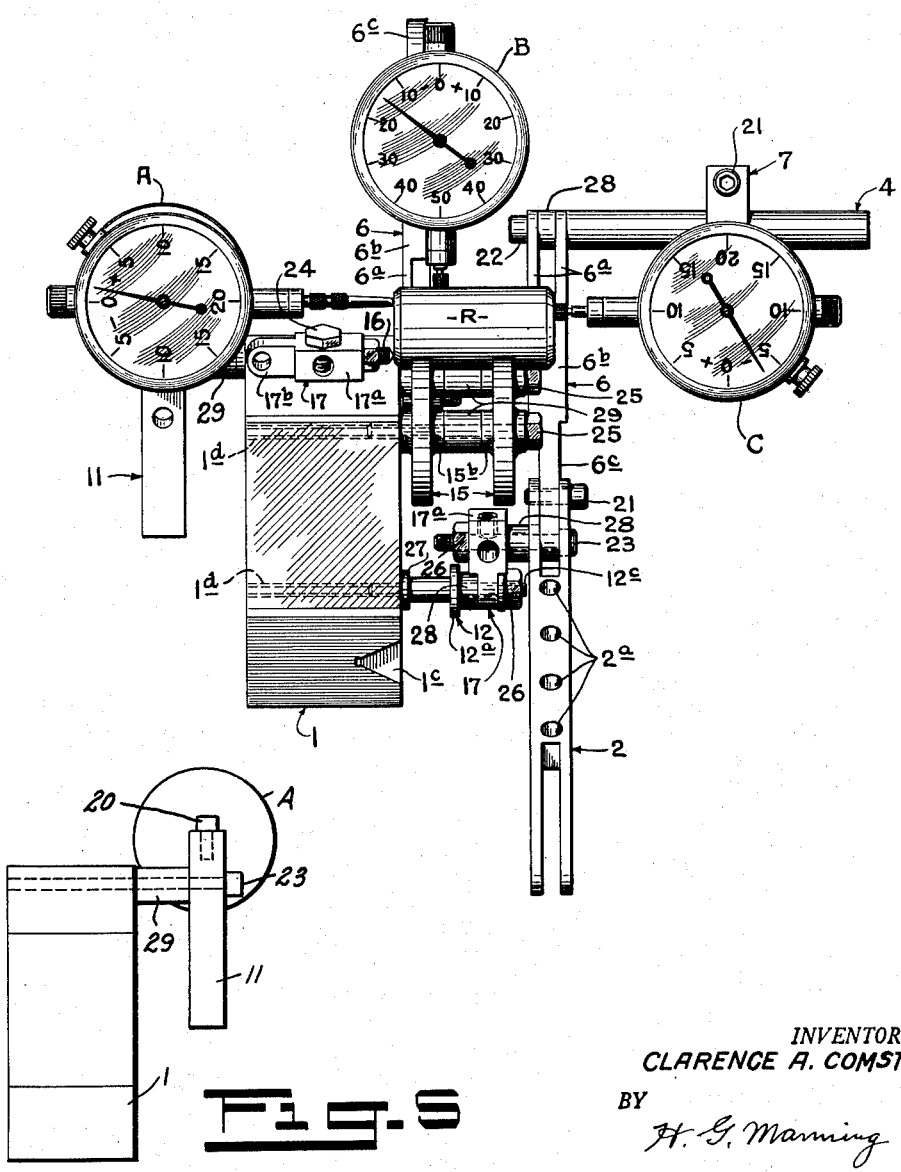
Fig. 1 represents a front view of the improved gauge and fixture set, as it appears when assembled for measuring the length, diameter and end-squareness of a cylindrical roller block.
Fig. 2 is an end view of the same, shown with the three indicator dials in operating position.

The design and building of gauges and fixtures to be used in the manufacture of a given article, is expensive and time-consuming, and in many cases, such gauges and fixtures do not function as intended or expected.

By means of the present invention, the above and other disadvantages have been avoided, and a practical universal gauge and fixture "erector" set has been developed, after many years of practical experience, which can be used for a large number of different setups in the designing tool room, and in manufacturing inspection departments for proving a theory or actually accomplishing any number of inspection measurements or holding operations.

The present universal gauge and fixture set consists of a base upon which may be assembled various shapes and sizes of links, clamps, studs, disks, bushings, brackets, nuts and screws, so that when they are used singly or in combinations, an unlimited number of gauges and fixtures may be produced. While the base block is especially useful in a hexagonal shape, various other shapes may be employed within the spirit and scope of the present invention.

While the basic set of the apparatus, as herein shown, comprises nineteen different parts, it is very likely that in any particular instance, some of said parts may be unnecessary in assembly of a desired gauge or fixture, depending upon the shape of the part engaged or held, and the results desired.

While it is obviously impossible to describe and illustrate all of the many uses to which this gauge and erector fixture set may be put, a typical setup or example is herein disclosed, showing a gauge or fixture for measuring the diameter, length, and end-squareness of a cylindrical precision roll for a roller bearing.

By the use of the present apparatus, the chief inspector in a factory manufacturing an article under the mass production system, may easily combine parts of the set herein disclosed in various manners to enable the checking of height, diameters, eccentricity, etc. in routine inspection.

Referring now to the drawings in which like reference numerals denote corresponding parts throughout the several views, the numeral 1 indicates a hexagonal base block having a hollow center bore 1a for fitting on an arbor or chuck, if desired, and a pair of aligned V-shaped top grooves 1b, 1c, to facilitate the attachment of various parts to said block. The block 1 also has a circular series of tapped apertures 1d. The letter A indicates a dial gauge for measuring the end-squareness in relation to the diameter of the roll R. The letter B represents a dial gauge for measuring the diameter of the roll R, and the letter C a dial gauge for measuring the length of said roll.

In order to secure the various gauges in assembled position, provision is made of a double-forked link 2 of rectangular cross-section in its central part, having a row of four central apertures 2a, and cross holes 2b. The numeral 3 indicates a rectangular link having reduced apertured ends 3a, 3b, and a central apertured section 3c.

Provision is also made of an elongated cylindrical link 4, having hollow tapped ends 4a for connection to other parts of the set, as will be understood.

The numeral 5 indicates a rectangular link having rounded ends, between which are three longitudinal slots 5a, 5b, 5c. The numeral 6 indicates a link having a forked apertured end 6a, a central apertured section 6b, and a reduced apertured section 6c at the other end thereof.

The numeral 7 indicates a short rectangular bracket having cross apertures in its sides and tapped at one end, the other end of said bracket being split at 7a to permit said block to be resiliently clamped upon a shaft, bolt, or screw.

The numeral 8 indicates a rectangular clamp having cross apertures in its central and end section, and having a central V-slot 8a on one side thereof.

The numeral 9 indicates a similar rectangular clamp having a V-slot 9a on one side, and a pair of tapped apertures 9b at the ends thereof.

The numeral 10 indicates a screw link having an apertured rectangular section 10a and a reduced threaded end section 10b.

The numeral 11 indicates an elongated rectangular link having cross apertures in its sides and tapped apertures 11a at both ends thereof.

The numeral 12 indicates a double screw stud or fulcrum pin having a central flange 12a and threaded ends 12b, 12c.

The numeral 13 indicates a link having a short rounded apertured rectangular end 13a and an elongated reduced threaded end section 13b.

The numeral 14 indicates a link having a reduced threaded end section 14a, and U-shaped apertured end yoke 14b.

The numeral 15 indicates a circular adjusting disk having a circular row of apertures 15a passing therethrough, and also having a raised central drilled neck 15b.

The numeral 16 indicates a screw stud having threaded end sections 16a, 16b, and a central hexagonal section 16c.

The numeral 17 indicates a short stud having an apertured rectangular end 17a, and a reduced apertured rounded end 17b.

The numeral 18 indicates a short rectangular stud having cross apertures on two sides thereof, and having a forked apertured end 18a.

The numeral 19 indicates a short link having a forked apertured end 19a, and an apertured reduced rounded section 19b at the other end thereof.

The numerals 20, 21, 22, 23 indicate machine screws of various lengths, and the numerals 24, 25 indicate a pair of bolts of different lengths. The numeral 26 indicates a nut, and the numerals 27, 28, 29 washers or bushings of various lengths for use in erecting various forms of gauges.

When it is desired to assemble the special combination gauge illustrated in Figs. 1, 2, and 3, for measuring the end squareness, length, and diameter of a bearing roll as herein disclosed, it will only be necessary to combine the various parts of the set shown in Fig. 4, and indicated by the numerals 1, 2, 4, 6, 7, 9, 11, 12, 15, and 17, in the manner shown in Figs. 1, 2, and 3.

One of the short studs 17 is pivotally mounted upon the side of the base block 1 by means of the double screw stud or fulcrum pin 12, which is engaged at one end in one of the tapped apertures 1d, and is provided at its other end with a nut 26 for pivotally retaining said short stud 17. Washers or bushings 27, 28, are applied to the screw stud 12 at opposite sides of the central flange 12a in a suitable arrangement to dispose the short stud 17 in the proper lateral position.

The reduced section 6c of a link 6 is secured to the rectangular end 17a of the above-mentioned short stud 17 by means of a screw 23 and a nut 26, a bushing 28 being disposed therebetween serving as a spacer between said short stud 17 and said link 6. The outer forked end 6a of the link 6 carries a cylindrical link 4 which is attached thereto by means of a screw 22, a bushing 28 being disposed as a spacer between the sides of the forked end 6a whereby a very rigid connection will be obtained.

The dial gauge C is adjustably clamped to the above-mentioned cylindrical link 4, a link 19 which is secured to a short split rectangular bracket 7 by means of a screw 21 engaged in the tapped end aperture of said bracket, said bracket being clamped upon the cylindrical link 4 by means of said screw 21.

A cylindrical roll R, which is the workpiece to be tested, is horizontally supported in such a position as to enable its end surface to be engaged by the gauge C by means of two pairs of circular adjusting disks 15, which are supported in parallel positions upon the side of the base block 1 by bolts 25 which are engaged through the respective pairs of disks 15 and screwed into a pair of the tapped apertures 1d in the base block 1. Bushings 29 are provided to serve as spacers between the disks 15 of the respective pairs.

Thus, the roll R may be rotated, and the gauge C may be swung about its fulcrum 12 so as to permit any point upon the end surface of said roll R to be tested by means of said gauge.

In order to facilitate swinging of the gauge C, the double forked link 2 is preferably secured to the link 6 by means of a screw 21 so as to serve as a handle. The roll R is adapted to be positively located in an endwise direction by means of a screw stud 16 which is carried by a short stud 17 secured to the upper surface of the base block 1 by means of a bolt 24.

The gauge B is mounted upon the base block 1 by means of a forked link 6 to which it is secured by means of a screw 22 and a nut 26. The lower forked end 6a of the above-mentioned link 6 embraces one of the adjusting disks 15, and is firmly clamped thereto by means of a screw 20. Thus, the gauge B is disposed in such a position as to engage the periphery of the roll R for checking the diameter of said roll.

The end squareness of the roll R is adapted to be tested by means of a gauge A which is pivotally connected to the base block 1 by means of a headed screw 20 (Figs. 3 and 5) which is engaged within a tapped hole in the end of a rectangular link 11 secured to the face of said base block by a screw 23 which is embraced by a spacer bushing 29.

While some of the parts shown in Fig. 4, to wit: numbers 3, 5, 8, 10, 13, 14, 16, 18, and 19 have not been included in the particular special gauge fixture illustrated in Figs. 1, 2, and 3, it will be understood that these parts may be used in the assembly of various other types of gauges and fixtures not herein shown, within the spirit and scope of the invention, which is not limited to the specific apparatus herein disclosed.

*Operation*

In the use of this special gauge herein illustrated in Figs. 1, 2, 3, the inspector will intermittently rotate the roll R which is supported on the four disks 15. At the same time, he will watch all three of the gauges A, B, C to determine any variation from the established tolerances or standard dimensions which may be indicated on the dials thereof.

It will be understood that the various gauges, links, studs, brackets, clamps, disks, bushings, and screws, which are comprised in the improved gauge apparatus, may be assembled to form various inspection fixtures which will be adapted for the testing of an infinite variety of workpieces, one such fixture being specifically disclosed herein. Further, the parts of the apparatus will form a very rigid and accurate fixture when assembled.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In an inspection gauge apparatus, a base block, having an end to end axis of symmetry, means secured in one end of said base for rotatably supporting a cylindrical bearing roll in such a manner that the longitudinal axis thereof is in parallel spaced relationship to the axis of symmetry of said base block, abutment means secured to one side of said base block and so disposed as to engage the lower edge of the inner end of said bearing roll, an end squareness indicating dial gauge, a link, a bushing, and a screw for detachably securing said dial gauge to the other end of said block so that the pressure sensitive end thereof is in engagement with the upper edge of the inner end of said bearing roll, a fulcrum pin rigidly secured in said first-mentioned end of said base block in such a manner that the longitudinal axis thereof is in parallel spaced relationship to the axis of symmetry of said base-block, a second link pivoted on said fulcrum pin, a third link rigidly connected at an angular relation to said second link to form a bell crank lever, and a dial indicator gauge adjustably and rigidly secured to said third link so that its pressure sensitive end is in engagement with the outer end of said bearing roll, whereby the end squareness and length thereof may simultaneously be measured upon manually turning said bearing roll in its supporting means while holding it against said abutment means.

2. The invention as defined in claim 1, including a fourth link pivotally secured to said first-mentioned end of said base, and a gauge adjustably secured to said fourth link and having its pressure sensitive end in contact with the upper side of said cylindrical surface of said bearing roll, whereby the diameter of said bearing roll may be measured simultaneously with the end squareness and length measurement thereof.

3. The invention as defined in claim 2, including an elongated handle member adjustably secured to said second link at a point intermediate the ends thereof, whereby said length indicating dial gauge may be moved out of engagement with the outer end of said bearing roll by swinging said handle in a plane perpendicular to said axis of symmetry.

CLARENCE A. COMSTOCK.

REFERENCES CITED

The following references are of record in the file of this patent:

UNITED STATES PATENTS

| Number | Name | Date |
| --- | --- | --- |
| 2,030,237 | Brittain | Feb. 11, 1936 |
| 2,039,224 | Hutchinson | Apr. 28, 1936 |
| 2,066,699 | Skelton | Jan. 5, 1937 |
| 2,318,970 | Richmond | May 11, 1943 |
| 2,352,507 | Aller | June 27, 1944 |
| 2,353,813 | Deeren | July 18, 1944 |
| 2,367,004 | Chitwood | Jan. 9, 1945 |
| 2,371,451 | Larson | Mar. 13, 1945 |
| 2,443,895 | Day | June 22, 1948 |
| 2,453,306 | Davis | Nov. 9, 1948 |

FOREIGN PATENTS

| Number | Country | Date |
| --- | --- | --- |
| 571,668 | Great Britain | Apr. 28, 1936 |